(12) United States Patent
Adington et al.

(10) Patent No.: US 9,973,407 B2
(45) Date of Patent: May 15, 2018

(54) BANDWIDTH-SENSITIVE CONTENT SHARING SYSTEM

(71) Applicant: INTERNATIONAL BUSINESS MACHINES CORPORATION, Armonk, NY (US)

(72) Inventors: Lori L. Adington, Raleigh, NC (US); James P. Brancato, Durham, NC (US); Joel Duquene, Raleigh, NC (US); Brian S. Utesch, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 728 days.

(21) Appl. No.: 14/151,927

(22) Filed: Jan. 10, 2014

(65) Prior Publication Data

US 2015/0200830 A1 Jul. 16, 2015

(51) Int. Cl.
*H04L 12/851* (2013.01)
*H04L 12/26* (2006.01)
*H04L 29/08* (2006.01)
*H04W 4/18* (2009.01)

(52) U.S. Cl.
CPC .......... *H04L 43/0876* (2013.01); *H04L 47/24* (2013.01); *H04L 67/04* (2013.01); *H04W 4/18* (2013.01)

(58) Field of Classification Search
None
See application file for complete search history.

(56) References Cited

U.S. PATENT DOCUMENTS

| 7,389,356 B2 * | 6/2008 | Shao | H04L 12/5693 345/419 |
| 7,593,686 B1 | 9/2009 | Knoop | |
| 8,363,672 B2 * | 1/2013 | Ben-Haim | H04L 12/66 370/468 |
| 8,804,508 B1 * | 8/2014 | Hobbs | H04N 21/2402 370/230 |

(Continued)

OTHER PUBLICATIONS

Im et al.; Ttl: AMUSE: Empowering Users for Cost-Aware Offloading with Throughput-Delay Tradeoffs; Conf. Ttl: IEEE INFOCOM 2013; 2013; Publisher: IEEE, Piscataway, NJ; Country of Publication: USA; ISBN: 978-1-4673-5944-3; Database: INSPEC.

*Primary Examiner* — Shirley Zhang
(74) *Attorney, Agent, or Firm* — Cuenot, Forsythe & Kim, LLC (57) ABSTRACT

A method for bandwidth-sensitive content sharing can begin with the establishment of a content sharing session between two or more end-user devices by a bandwidth-sensitive content sharing system. At least one of the two or more end-user devices can be a mobile device having a network constraint and/or a data usage constraint. A bandwidth limitation can be determined for the mobile device from network connection data and user data. The bandwidth limitation can indicate a restriction to content sections of a content item the mobile device is to receive during the content sharing session. The content item shared with the mobile device can be filtered based upon a priority value for each content section of the content item. A content section can be an identifiable and discrete encapsulation of data within the content item. The filtered content item can satisfy the bandwidth limitation of the mobile device.

12 Claims, 6 Drawing Sheets

(56) References Cited

U.S. PATENT DOCUMENTS

| | | | |
|---|---|---|---|
| 9,001,701 B1* | 4/2015 | Zhang | H04L 65/4084 370/260 |
| 9,054,996 B2* | 6/2015 | Voruganti | H04L 47/12 |
| 9,130,864 B2* | 9/2015 | Keith | H04L 47/2433 |
| 2003/0072376 A1* | 4/2003 | Krishnamachari | H04N 21/23432 375/240.26 |
| 2004/0253980 A1* | 12/2004 | Lane | H04L 1/0009 455/552.1 |
| 2006/0218230 A1 | 9/2006 | McNulty et al. | |
| 2006/0248570 A1 | 11/2006 | Witwer | |
| 2006/0268871 A1* | 11/2006 | Van Zijst | H04L 47/125 370/390 |
| 2007/0200923 A1* | 8/2007 | Eleftheriadis | H04N 7/152 348/14.08 |
| 2008/0270567 A1 | 10/2008 | Stiers et al. | |
| 2010/0202456 A1* | 8/2010 | Godor | H04L 12/5695 370/392 |
| 2011/0060996 A1 | 3/2011 | Alberth, Jr. et al. | |
| 2011/0196758 A1 | 8/2011 | Smith | |
| 2011/0267951 A1* | 11/2011 | Stanwood | H04L 41/5022 370/235 |
| 2012/0013748 A1* | 1/2012 | Stanwood | H04L 41/5022 348/192 |
| 2012/0158918 A1 | 6/2012 | LeBlanc et al. | |
| 2012/0230345 A1* | 9/2012 | Ovsiannikov | H04L 47/41 370/412 |
| 2013/0201279 A1* | 8/2013 | Civanlar | H04N 7/152 348/14.09 |
| 2013/0227068 A1 | 8/2013 | Yasrebi et al. | |
| 2015/0009826 A1* | 1/2015 | Ma | H04W 28/0268 370/235 |

* cited by examiner

BANDWIDTH-SENSITIVE CONTENT SHARING SYSTEM

BACKGROUND

The present invention relates to the field of content sharing and, more particularly, to a bandwidth-sensitive content sharing system.

The use of mobile devices for business-related functions like online collaboration and online meetings is on the rise. As the power and functionality of these mobile devices like tablet computers continues to increase, mobile devices will become a key operating component, much like desktop computers.

However, mobile devices are resource-constrained, meaning that a mobile device often has a limited amount of power or network connection speed; particularly when compared to their non-mobile counterparts (e.g., a desktop computer). A variety of techniques have been employed by mobile devices and the software systems that they most frequently rely upon to address these resource constraints.

Most approaches to handling resource constraints focus on controlling resource consumption by the mobile device; typically, changing settings that consume resources when not needed. While these techniques are beneficial for the mobile device, they do not address resource consumption caused by data received, such as during an online content sharing session. Data usage is as key of a concern as power usage, specifically when a mobile device is not subscribed to an unlimited data plan. The task of monitoring data usage is generally left to the user of the mobile device.

BRIEF SUMMARY

One aspect of the present invention can include a method for bandwidth-sensitive content sharing. Such a method can begin with the establishment of a content sharing session between two or more end-user devices by a bandwidth-sensitive content sharing system. At least one of the two or more end-user devices can be a mobile device having a network constraint and/or a data usage constraint. A user of one of the end-user devices can act as an originator of the content sharing session. A bandwidth limitation can be determined for the mobile device from network connection data and user data. The bandwidth limitation can indicate a restriction to content sections of a content item the mobile device is to receive during the content sharing session. The content item shared with the mobile device can be filtered based upon a priority value for each content section of the content item. A content section can be an identifiable and discrete encapsulation of data within the content item. The filtered content item can satisfy the bandwidth limitation of the mobile device.

Another aspect of the present invention can include a system for bandwidth-sensitive content sharing. Such a system can include a content item, two or more end-user devices, a client application, and a bandwidth-sensitive content sharing system. The content item can be comprised of content sections, each representing an identifiable and discrete encapsulation of data within the content item. Each content section can be assigned a priority by the author of the content item. The end-user devices can be configured to participate in a content sharing session for the content item. At least one of the end-user devices can be a mobile device having a network constraint and/or a data usage constraint. The client application can be configured to present the content item upon the end-user devices and determine a bandwidth limitation of the mobile device. The bandwidth limitation can indicate a restriction to the content sections the mobile device is to receive during the content sharing session. The bandwidth-sensitive content sharing system can be configured to filter the content item provided to the mobile device during the content sharing session according to the bandwidth limitation.

Yet another aspect of the present invention can include a computer program product that includes a computer readable storage medium having embedded computer usable program code. The computer usable program code can be configured to establish a content sharing session between two or more end-user devices. At least one of the end-user devices can be a mobile device having a network constraint and/or a data usage constraint. A user of an end-user device can act as an originator of the content sharing session. The computer usable program code can be configured to determine a bandwidth limitation for the mobile device from network connection data and user data. The bandwidth limitation can indicate a restriction to content sections of a content item the mobile device is to receive during the content sharing session. A content section can be an identifiable and discrete encapsulation of data within the content item. The computer usable program code can be configured to filter the content item shared with the mobile device based upon a priority value for each content section of the content item. The filtered content item can satisfy the bandwidth limitation of the mobile device.

DETAILED DESCRIPTION

The present invention discloses a solution for providing a content item to a mobile device that is filtered based upon a bandwidth limitation of the mobile device. A bandwidth-sensitive content sharing system can be used by devices participating in a content sharing session. When the participating device is a mobile device, the bandwidth-sensitive content sharing system can determine a bandwidth limitation for the mobile device based upon connection data that takes into account data usage restrictions. The bandwidth limitation, along with priorities defined by the author of the content item, a group that the user belongs to, and/or the user, can be used to filter sections of the content item to provide the user of the mobile with content sections of high importance that meet their data usage and/or network connectivity conditions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
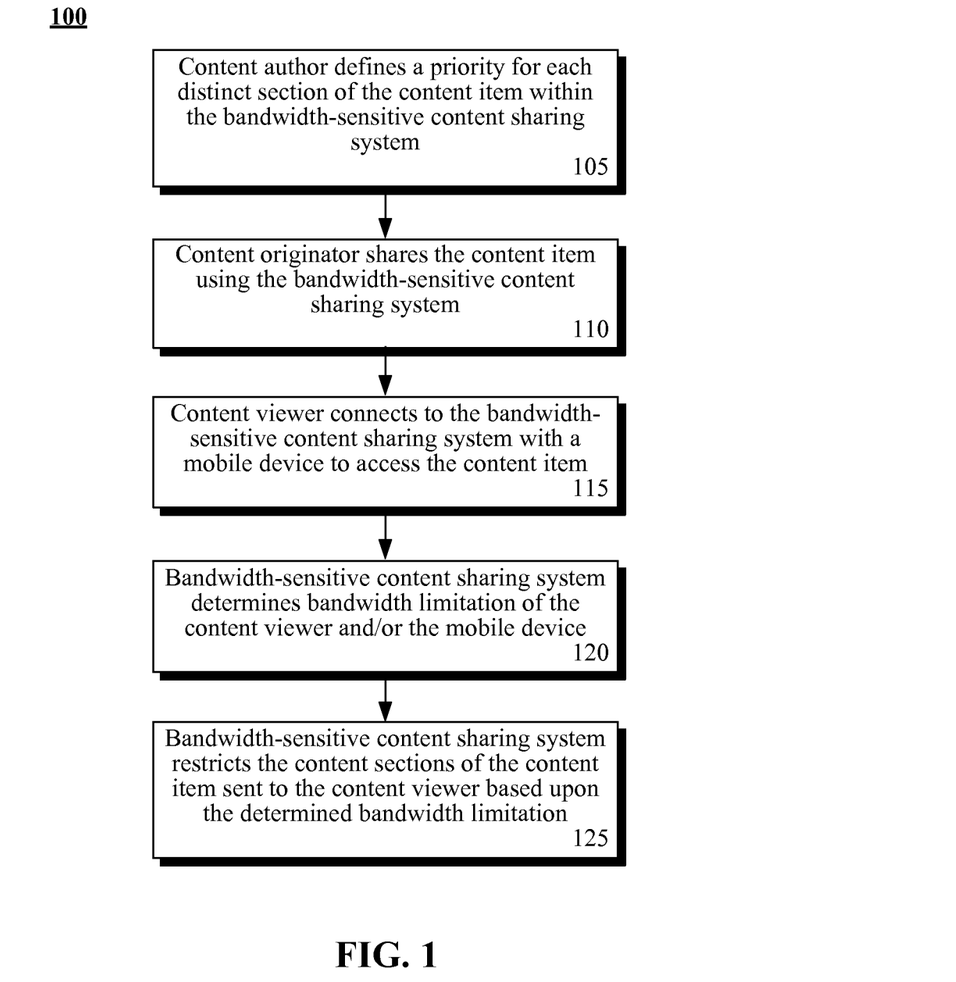
FIG. 1 is a flowchart of a method expressing the basic use of a bandwidth-sensitive content sharing system in accordance with embodiments of the inventive arrangements disclosed herein.

FIG. 1 is a flowchart of a method 100 expressing the basic use of a bandwidth-sensitive content sharing system in accordance with embodiments of the inventive arrangements disclosed herein. Method 100 can begin in step 105 where the content author defines a priority for each distinct section of the content item within the bandwidth-sensitive content sharing system. The content author can be a user who has created the content item and/or uploaded the content item to the bandwidth-sensitive content sharing system.

The bandwidth-sensitive content sharing system can be a computer system designed to share the content item among multiple end-user devices in a manner that takes into account conditions affecting the bandwidth available to end-user devices that are resource-constrained.

The content originator can share the content item using the bandwidth-sensitive content sharing system in step 110. The content originator can be a user of the bandwidth-sensitive content sharing system that initiates and/or controls the content sharing session for the content item. The content originator can be the content author.

In step 115, a content viewer can connect to the bandwidth-sensitive content sharing system with a mobile device to access the content item. A content viewer can be another user of the bandwidth-sensitive content sharing system that is participating in the content sharing session of the content item. It is important to note that a mobile device, by its inherent nature, can be considered a resource-constrained end-user device.

The bandwidth-sensitive content sharing system can determine the bandwidth limitation of the content viewer and/or the mobile device in step 120. In step 125, the bandwidth-sensitive content sharing system can restrict the content sections of the content item sent to the mobile device based upon the bandwidth limitation. Thus, each content viewer who connects to the content sharing session with a mobile device can receive a version of the content item that meets their specific bandwidth limitation.

For example, a first content viewer can connect to the content sharing session using a laptop computer having a network connection that uses a network cable and a second content viewer can connect using a tablet computer having a wireless connection. In terms of data transmission, a wireless connection can be considered to have a lower transmission rate than a network cable connection. As such, the second content viewer can have a more restrictive bandwidth limitation than the first content viewer. Therefore, the second content viewer can receive fewer content sections of the content item than the first content viewer.

Figure 2:
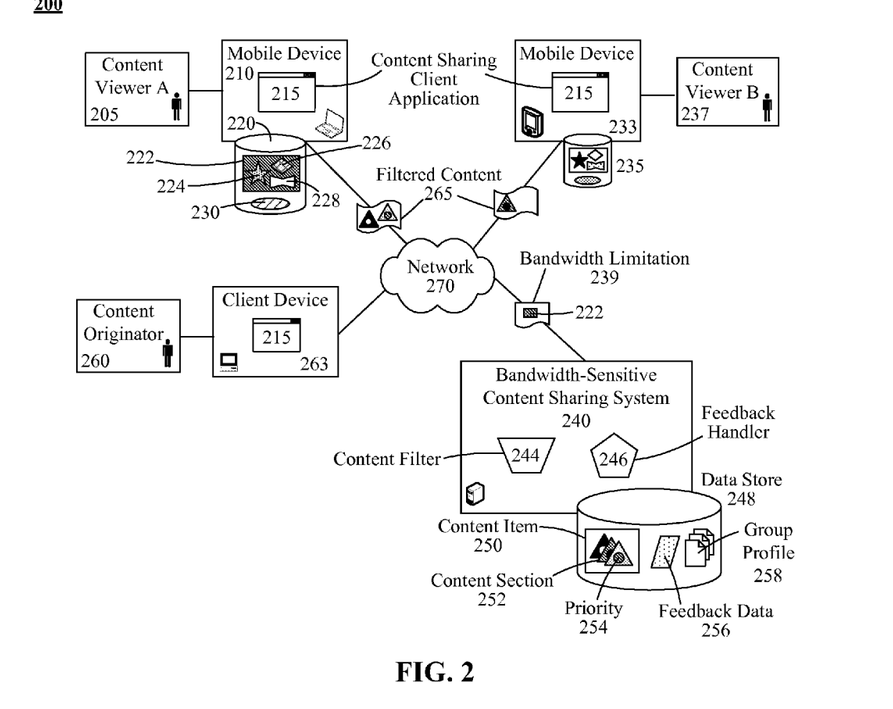
FIG. 2 is a schematic diagram illustrating a system that utilizes a bandwidth-sensitive content sharing system in accordance with an embodiment of the inventive arrangements disclosed herein.

FIG. 2 is a schematic diagram illustrating a system 200 that utilizes a bandwidth-sensitive content sharing system 240 in accordance with embodiments of the inventive arrangements disclosed herein. System 200 can perform the steps of method 100.

In system 100, a content originator 260 can use the bandwidth-sensitive content sharing system 240 to share a content item 250 with content viewer A 205 and content viewer B 237. The content originator 260 can be a user that initiates and/or controls the content sharing session for the content item 250. The content viewers 205 and 237 can be other users of the bandwidth-sensitive content sharing system 240 that the content originator 260 is sharing the content item 250.

The content originator 260 and content viewers 205 and 237 can interact with the bandwidth-sensitive content sharing system 240 via a content sharing client application 215, herein referred to as the client application 215. The client application 215 can be a graphical user interface capable of operating on the client device 263 of the content originator 260 and the mobile devices 210 and 233 of the content viewers 205 and 237.

The client device 210 can represent a variety of computing devices capable of supporting operation of the client application 215 and communicating with the bandwidth-sensitive content sharing system 240 over a network 270. Likewise, the mobile devices 210 and 233 can represent a variety of mobile computing devices capable of supporting operation of the client application 215 and communicating with the bandwidth-sensitive content sharing system 240 over a network 270.

The mobile devices 210 and 233 can each include a data store 220 and 235 that contains user data 222 and connection data 230, which can vary between the mobile devices 210 and 233 and/or content viewers 205 and 237. The user data 222 can include a group association 224 for the content viewer 205 and 237, content priorities 226, and user preferences 228. The group association 224 can be an identifier that associates the content viewer 205 and 237 with a group profile 258 of the bandwidth-sensitive content sharing system 240.

The content priorities 226 can be priority values for content sections 252 of the content item 250 defined by the content viewer 205 and 237. The content priorities 226 can represent an importance of the content section 252 to the specific content viewer 205 and 237. The user preferences 228 can be user-specified values for adjustable parameters of the bandwidth-sensitive content sharing system 240.

The connection data 230 can represent a variety of data pertaining to the network 270 connection of the mobile device 210 and 233. Examples of connection 230 can include, but are not limited to a data plan associated with the content viewer 205 and 237 and/or mobile device 210 and 233, a current amount of data usage for the data plan, connection speed, network 270 response time, and the like.

Figure 2A:
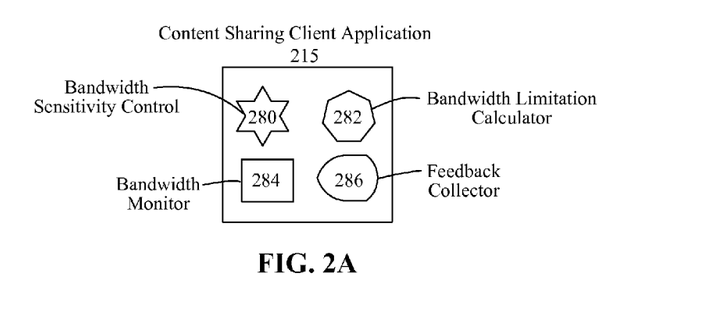
FIG. 2A is a block diagram of the client application of the bandwidth-sensitive content sharing system in accordance with an embodiment of the inventive arrangements disclosed herein.

The client application 215 can use the user data 222 and connection data 230 when determining the bandwidth limitation 239 of the mobile device 210 and 233. The client application 215, as shown in FIG. 2A, can include a bandwidth sensitivity control 280, a bandwidth limitation calculator 282, a bandwidth monitor 284, and a feedback collector 286.

The bandwidth sensitivity control 280 can be an adjustable user interface element of the client application 215 that indicates a user-selected limitation for the shared content item 250. Examples of the bandwidth sensitivity control can include, but are not limited to, a slider bar, a drop-down menu, a set of checkboxes, a set of radio buttons, and the like.

The bandwidth limitation calculator 282 can represent a variety of means by which the bandwidth limitation 239 is determined. Examples of the means employed by the bandwidth limitation calculator 282 can include, but are not limited to, heuristic algorithms, procedural algorithms, weighting values, a combination approaches, and the like. The bandwidth limitation calculator 282 can utilize values contained in the user data 222 and/or connection data 230 as well as the value of the bandwidth sensitivity control 280 to determine the bandwidth limitation 239 for the mobile device 210 and 233. The bandwidth limitation 239 can represent a restriction to the content sections 252 of the content item 250 that are provided to the mobile device 210 and 233 during the content sharing session.

The bandwidth monitor 284 can be the component of the client application 215 configured to detect changes to the user data 222, connection data 230, and/or bandwidth sensitivity control 280. Significant changes to one or more of these data values can cause the bandwidth monitor 284 to trigger the bandwidth limitation calculator 282 to recalculate the bandwidth limitation 239. The significance of a value change can be determined based upon predefined thresholds (not shown).

The feedback collector 286 can request feedback data 256 from the content viewer 205 and 237 once the content sharing session is complete. For example, the feedback collector 286 can present the content viewer 205 and 237 with a questionnaire within the client application 215. The questionnaire can prompt the content viewer 205 and 237 to rate the applicability of the filtered content 265 that was presented during the content sharing session.

The bandwidth-sensitive content sharing system 240 can represent the hardware and/or software components required to provide mobile devices 210 and 233 with filtered content 256 of a content item 250 during a content sharing session based upon the specific bandwidth limitation 239 of the mobile device 210 and 233. The bandwidth-sensitive content sharing system 240 can utilize various system architectures like a client-server architecture (e.g., online collaboration system) or a peer-to-peer architecture (e.g., remote direct connection).

The bandwidth-sensitive content sharing system 240 can include a content filter 244, a feedback handler 246, and a data store 248 having the content item 250, feedback data 256, and group profiles 258 stored therein. The content filter 244 can be the component of the bandwidth-sensitive content sharing system 240 that filters the content sections 252 of the content item 250 based upon the bandwidth limitation 239 provided by the client application 215 installed upon the mobile device 210 and 233. The content filter 244 can provide each mobile device 210 and 233 with filtered content 256.

The content item 250 can be a data structure that contains a variety of data. The data of the content item 250 can be encapsulated in discrete and identifiable content sections 252. For example, a content item 250 can be a text file with each paragraph of text representing a content section 252. As another example, the content item 250 can be a multimedia presentation and the content sections 252 can correspond to each block of text, embedded video file, or image included in the presentation.

Each content section 252 can include a priority 254 that is defined by the author of the content item 250 or another user designated by the author. In some circumstances, the author of the content item 250 can be the content originator 260 of the content sharing session. The priority 254 can be a quantitative representation of the importance of the content section 252. The scale and/or representation used to express the priority 254 can vary based upon the implementation of the bandwidth-sensitive content sharing system 240.

A group profile 258 can represent the preferred priority values of content sections 252 applicable to a set of content viewers 205 and 237 having the same group association 224 in their user data 222. Group profiles 258 can be used to express the differences in focus of various user roles. The content filter 244 can be configured to resolve disparate priority values 254 of content sections 252 when filtering the content item 250 for a mobile device 210 and 233.

For example, the author can set the priority 254 of an image 252 in a presentation 250 to "1", where the priority 254 is represented by a numeric scale having "1" as the highest importance and "5" as the lowest importance. The group profile 258 of content viewer A 205 can indicate that images 252 have a priority of "2". Content viewer A 205 can indicate that images 252 have a content priority 226 of "4". The content filter 244 can use an algorithm or set of rules determine that the content priority 226 takes precedence for the image 252.

The group profiles 258 can be manually maintained by an administrator of the bandwidth-sensitive content sharing system 240 and/or automatically adjusted by the feedback handler 246. The feedback handler 246 can represent the component of the bandwidth-sensitive content sharing system 240 that stores and analyzes feedback data 256 provided by the feedback collector 286 of the client application 215. The analysis of the feedback data 256 can illustrate how content viewers 205 and 237 view the importance of content sections 252 provided to them in their filtered content 256.

For example, the group profile 258 can define the priority of a specific content section 252 to be "2". Analysis of the feedback data 256 from content viewers 205 and 237 associated with the group profile 258 can reflect a rating of "3". The feedback handler 246 can then adjust the group profile 258 to reflect the analysis and provide better content filtering to members of the group.

It should be noted that, while system 100 illustrates an embodiment of the present disclosure having only content viewers 205 and 237 utilizing mobile devices 210 and 233, in another embodiment, other content viewers using devices that are not resource-constrained can also participate in the content sharing session using the client application 215. In such an embodiment, the client application 215 can detect that the device is not resource-constrained and, therefore, need not provide the bandwidth-sensitive content sharing system 240 with a bandwidth limitation 239.

As used herein, presented data stores 220, 235, and 248 can be a physical or virtual storage space configured to store digital information. Data stores 220, 235, and 248 can be physically implemented within any type of hardware including, but not limited to, a magnetic disk, an optical disk, a semiconductor memory, a digitally encoded plastic memory, a holographic memory, or any other recording medium. Data stores 220, 235, and 248 can be a stand-alone storage unit as well as a storage unit formed from a plurality of physical devices. Additionally, information can be stored within data stores 220, 235, and 248 in a variety of manners. For example, information can be stored within a database structure or can be stored within one or more files of a file storage system, where each file may or may not be indexed for information searching purposes. Further, data stores 220, 235, and/or 248 can utilize one or more encryption mechanisms to protect stored information from unauthorized access.

Network 270 can include any hardware/software/and firmware necessary to convey data encoded within carrier waves. Data can be contained within analog or digital signals and conveyed through data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Network 270 can also include circuit-based communication components and mobile communication components, such as telephony switches, modems, cellular communication towers, and the like. Network 270 can include line based and/or wireless communication pathways.

Figure 3:
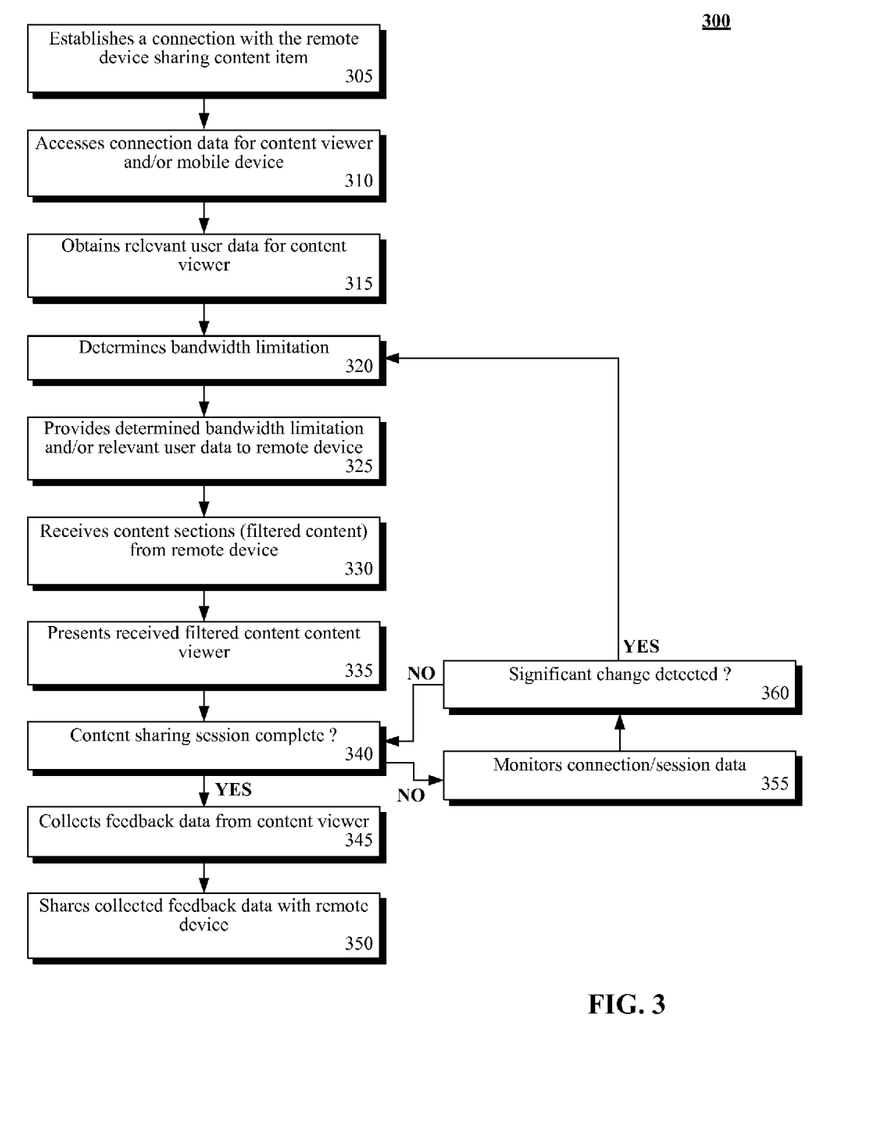
FIG. 3 is a flowchart of a method describing operation of the content sharing client application in accordance with an embodiment of the inventive arrangements disclosed herein.

FIG. 3 is a flowchart of a method 300 describing operation of the content sharing client application in accordance with embodiments of the inventive arrangements disclosed herein. Method 300 can be performed within the context of system 200 and/or method 100.

Method 300 can begin in step 305 where the client application can establish a connection to the remote device sharing the content item. The remote device can vary based upon the architecture of the bandwidth-sensitive content sharing system; the remote device can be the content server of a client-server architecture or the client device of the content originator in a peer-to-peer architecture.

The connection data for the content viewer and/or mobile device can be accessed in step 310; some connection data can be directly associated with the mobile device, whereas other connection data is linked to the content viewer. In step 315, user data relevant to the content sharing session can be obtained for the content viewer. For example, only the content priorities for the content sections contained in the content item can be obtained instead of the content priorities for all content sections.

The bandwidth limitation can be determined in step 320. In step 325, the determined bandwidth limitation and/or relevant user data can be provided to the remote device. The content sections comprising the filtered data can be received from the remote device in step 330. In step 335, the received filtered data can be presented to the content viewer.

In step 340, it can be determined if the content sharing session is complete. When the content sharing session is not complete, connection and/or session data can be monitored in step 355. In step 360, it can be determined if a significant change to the connection/session data is detected. When a significant change is not detected, flow of method 300 can return to step 340 to reassess termination of the content sharing session. When a significant change is detected, flow of method 300 can return to step 320 to recalculate the bandwidth limitation using the new changed value.

When the content sharing session is complete, feedback data can be collected from the content viewer in step 345. In step 350, the collected feedback data can be shared with the remote device. Step 350 can be optional depending upon how group profiles and feedback analysis are handled by the bandwidth-sensitive content sharing system.

Figure 4:
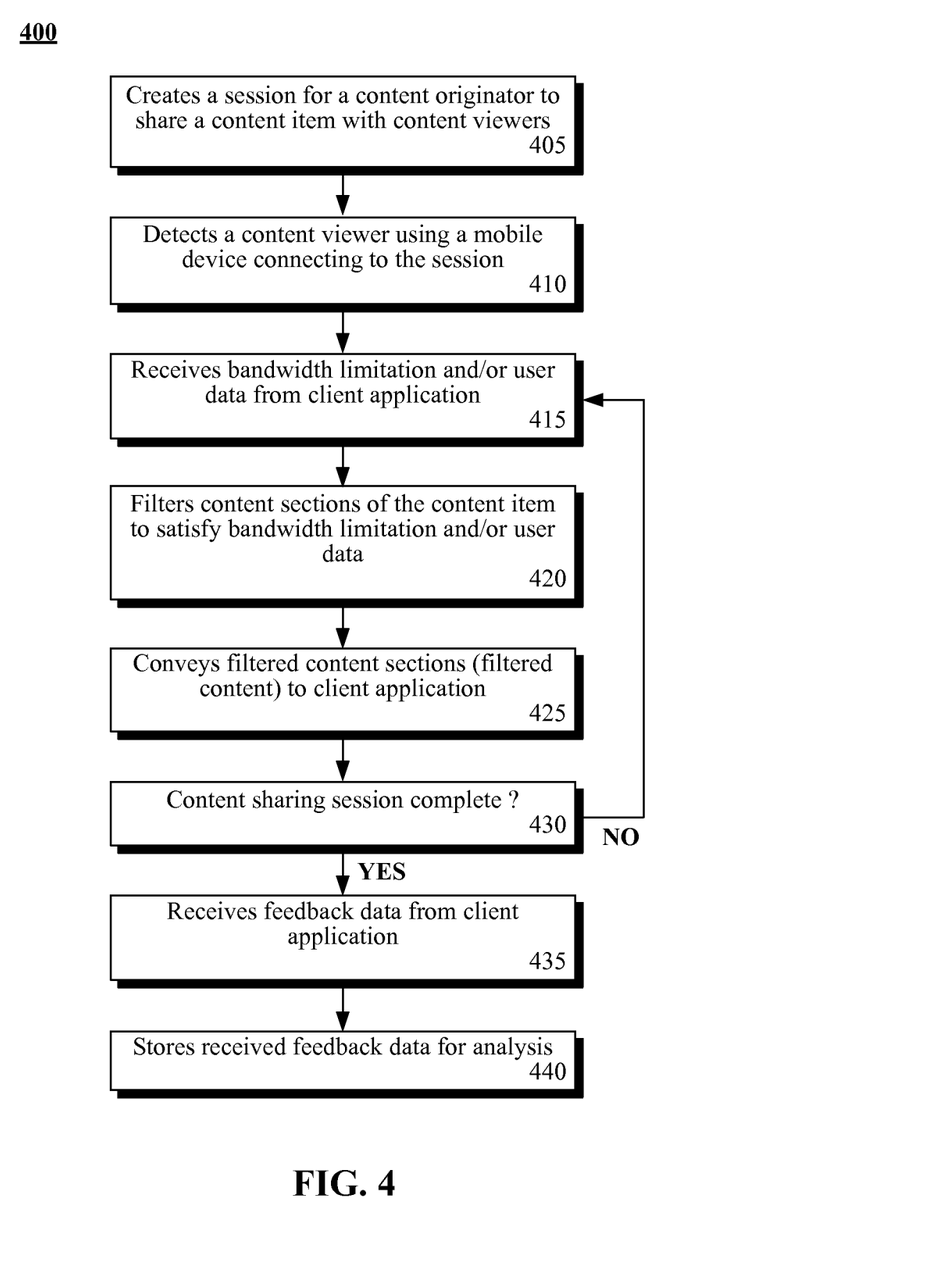
FIG. 4 is a flowchart of a method detailing the operation of the server component of a bandwidth-sensitive content sharing system having a client-server architecture in accordance with embodiments of the inventive arrangements disclosed herein.

FIG. 4 is a flowchart of a method 400 detailing the operation of the server component of a bandwidth-sensitive content sharing system having a client-server architecture in accordance with embodiments of the inventive arrangements disclosed herein. Method 400 can be performed within the context of system 200, method 200, and/or in conjunction with method 300.

Method 400 can begin in step 405 where the bandwidth-sensitive content sharing system can create a session for a content originator to share a content item with content viewers. A content viewer using a mobile device can be detected connecting to the session in step 410.

In step 415, the bandwidth limitation and/or user data for the content viewer can be received from the client application running on the mobile device. The content sections of the content item can be filtered based upon the bandwidth limitation and/or user data in step 420.

In step 425, the filtered content sections, filtered content, can be conveyed to the client application. It can be determined if the content sharing session is complete in step 430. When the content sharing session is not complete, flow of method 400 can return to step 415 to receive updated data from client application.

When the content sharing session is complete, step 435 can be performed where feedback data can be received from the client application. The received feedback data can be stored for analysis in step 440.

Figure 5:
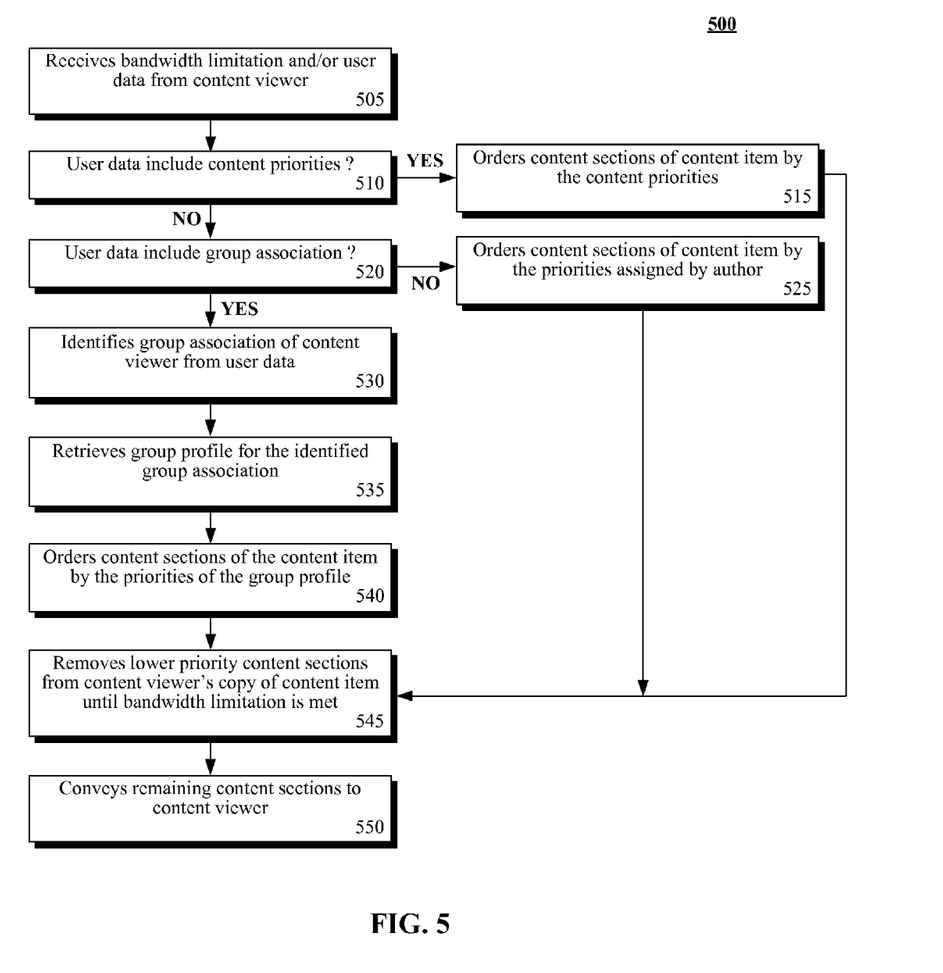
FIG. 5 is a flowchart of a method describing the provision of filtered content by the bandwidth-sensitive content sharing system in accordance with embodiments of the inventive arrangements disclosed herein.

FIG. 5 is a flowchart of a method 500 describing the provision of filtered content by the bandwidth-sensitive content sharing system in accordance with embodiments of the inventive arrangements disclosed herein. Method 500 can be performed within the context of system 200 and/or method 100 and can represent an example implementation of step 420 of method 400.

Method 500 can begin in step 505 where the bandwidth limitation and/or user data can be received from the content viewer. It can be determined if the received user data includes content priorities in step 510. When the user data includes content priorities, step 515 can be performed where the content sections of the content item can be ordered by the content priorities included in the user data.

When the user does not include content priorities, step 520 can be performed where it can be determined if the user includes a group association for the content viewer. When the user data does not includes a group association, the content sections of the content item can be ordered by the priority assigned by the content author in step 525.

When the user data includes a group association, step 530 can be performed where the group association for the content viewer can be identified. The group profile for the identified group association can be retrieved in step 535. In step 540, the content sections of the content item can be ordered by the priorities of the group profile.

Upon completion of step 540, step 515, or step 525, the content sections having a lower priority can be removed from the content viewer's copy of the content item in step 545 until the content viewer's bandwidth limitation is met. The remaining content sections can be conveyed to the content viewer in step 550.

Figure 6:
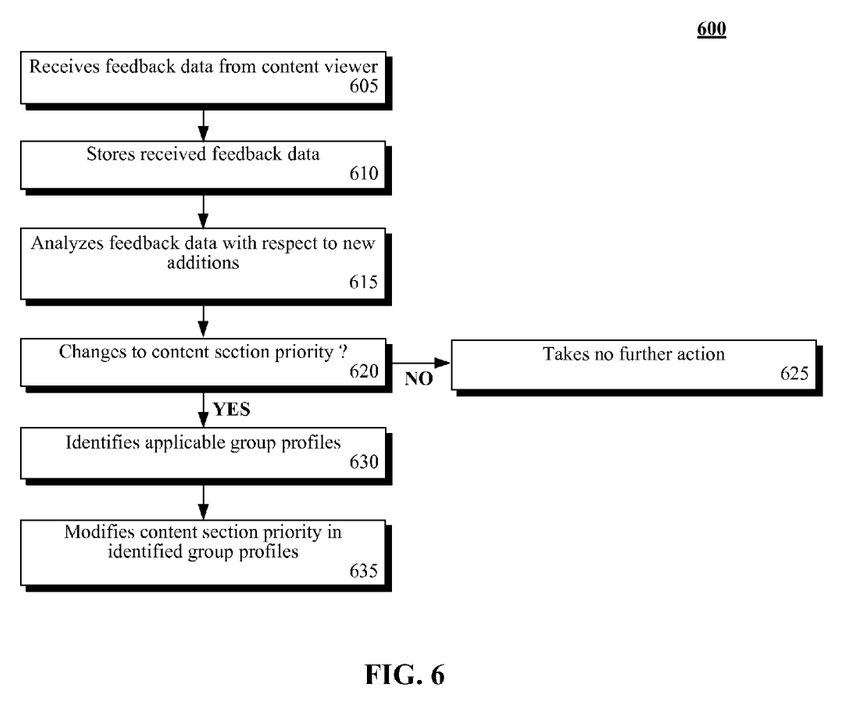
FIG. 6 is a flowchart of a method detailing the handling of feedback data by the bandwidth-sensitive content sharing system in accordance with embodiments of the inventive arrangements disclosed herein.

FIG. 6 is a flowchart of a method 600 detailing the handling of feedback data by the bandwidth-sensitive content sharing system in accordance with embodiments of the inventive arrangements disclosed herein. Method 600 can be performed within the context of system 200 and/or method 400.

Method 600 can begin in step 605 where the bandwidth-sensitive content sharing system can receive feedback data from a content viewer. The received feedback data can be stored in step 610. In step 615, the feedback data can be analyzed with respect to the new additions.

In step 620, it can be determined if the analysis of the feedback data indicates the need to make a change to the priority of a content section in the group profile. When a change to a content section priority is not indicated, no further action is taken in step 625. When a change to a content section priority is indicated, step 630 can be performed where the applicable group profiles can be identified. The content section priority can be modified in the applicable group profiles in step 635.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for bandwidth-sensitive content sharing comprising:

establishing of a content sharing session between at least two end-user devices by a bandwidth-sensitive content sharing system, wherein at least one of the at least two end-user devices is a mobile device having at least one of a network constraint and a data usage constraint, and, wherein a user of one of the at least two end-user devices acts an originator of the content sharing session;

determining a bandwidth limitation for the mobile device from network connection data and user data, wherein said bandwidth limitation indicates a restriction to content sections of a content item the mobile device is to receive during the content sharing session, wherein a content section is an identifiable and discrete encapsulation of data within the content item; and filtering the content item shared with the mobile device based upon a priority value for each content section of the content item, wherein the filtered content item satisfies the bandwidth limitation of the mobile device, wherein filtering the content item further comprises:
  prioritizing the content sections according to priority values predefined by an author of the content item;
  removing the content section having a lowest priority value from a copy of the content item being sent to the mobile device;
  assessing the copy of the content item for compliance with the bandwidth limitation; and
  when the copy of the content item is compliant with the bandwidth limitation, conveying the copy of the content item to the mobile device, and prioritizing the content sections further comprises:
  when the user data includes a group association for the user of the mobile device, obtaining a group profile corresponding to the group association, wherein the group profile expresses priority values for content sections defined for a subset of users;
  when the user data includes user-defined content priorities, retrieving user-defined content priority values for the content sections comprising the content item;
  comparing the priority values predefined by the author with the corresponding priority values of at least one of the group profile and the user-defined content priorities; and
  when, for the content section, a discrepancy exists between a priority value predefined by the author and at least one corresponding priority value, resolving the discrepancy in accordance with a set of resolution rules, wherein either the priority value predefined by the author or one of the at least one corresponding priority values is given precedence for the content section.

2. The method of claim 1, wherein determining the bandwidth limitation further comprises:
  obtaining the connection data for the mobile device and the user data for the user of the mobile device, wherein said connection data comprises at least network parameters for a network connection between the mobile device and the content sharing session and a data plan associated with the mobile device or the user of the mobile device, wherein the data plan defines at least a data usage limit and a current amount of data usage;
  receiving a user-defined bandwidth sensitivity value from a user interface of the bandwidth-sensitive content sharing system operating upon the mobile device, wherein a predefined default value is used when a user-entered bandwidth sensitivity value is unavailable; and
  dynamically synthesizing the bandwidth limitation from the connection data, user data, and the user-defined bandwidth sensitivity value using a predefined algorithm.

3. The method of claim 2, further comprising:
  monitoring the connection data and the user-defined bandwidth sensitivity value for changes that exceed predetermined threshold values; and
  when a value change that exceeds a predetermined threshold value is detected, resynthesizing the bandwidth limitation using the detected value change, wherein the resynthesized bandwidth limitation affects the filtering of the content item shared with the mobile device.

4. The method of claim 1, further comprising:
  when the copy of the content item is non-compliant with the bandwidth limitation, repeating the removing of the content section having the lowest priority value and the assessing of the content item for compliance.

5. The method of claim 1, further comprising:
  upon termination of the content sharing session, requesting feedback data from the user of the mobile device, wherein said feedback data is focused upon at least a quality of the filtered content item and an applicability of the content sections of the filtered content item to the user's needs;
  analyzing the feedback data to assess an accuracy of the filtering performed upon the content item; and
  when necessary as a result of said analysis, adjusting at least one parameter affecting the filtering of the content item.

6. The method of claim 1, wherein the bandwidth-sensitive content sharing system utilizes one of a client-server architecture and a peer-to-peer architecture, wherein, in the client-server architecture, a client application running on the mobile device performs the determining of the bandwidth limitation and a server application running on a remotely-located server performs the filtering of the content item, and, wherein, in the peer-to-peer architecture, the client application running on the mobile device performs the determining of the bandwidth limitation and the client application running on an end-user device of the originator performs the filtering of the content item.

7. The method of claim 1, wherein the determining of the bandwidth limitation and the filtering of the content item are performed independently for each mobile device participating in the content sharing session.

8. A system for bandwidth-sensitive content sharing comprising:
  a content item comprised of a plurality of content sections, wherein a content section is an identifiable and discrete encapsulation of data, wherein each content section is assigned a priority by an author of the content item;
  at least two end-user devices configured to participate in a content sharing session for the content item, wherein at least one of the at least two end-user devices is a mobile device having at least one of a network constraint and a data usage constraint;
  a client application configured to present the content item upon the at least two end-user devices and determine a bandwidth limitation of the mobile device, wherein the bandwidth limitation indicates a restriction to the plurality of content sections the mobile device is to receive during the content sharing session;
  a bandwidth-sensitive content sharing system configured to filter the content item provided to the mobile device during the content sharing session according to the bandwidth limitation;
  a plurality of connection data comprising at least network parameters for a network connection between the mobile device and the content sharing session and a data plan associated with the mobile device or a user of the mobile device, wherein the data plan defines at least a data usage limit and a current amount of data usage;
  a plurality of user data defining at least one of an identifier of the user of the mobile device, a group association of the user, a plurality of content priorities defined by the user, and a plurality of user preferences, wherein the client application provides the bandwidth-sensitive content sharing system with user data pertinent to the content sharing session;
a bandwidth sensitivity control configured to act as a user-adjustable user interface element that allows the user to indicate a weight that bandwidth is to be given for filtering the content item;
a bandwidth monitor configured to detect significant changes in the plurality of connection data and bandwidth sensitivity control during the content sharing session, wherein a significant change is a difference in subsequent values that exceeds a predetermined threshold value;
a bandwidth limitation calculator configured to determine the bandwidth limitation for the mobile device based upon the plurality of connection data and a value of the bandwidth sensitivity control; and
a feedback collector configured to gather feedback data from the user of the mobile device upon termination of the content sharing session, wherein
the bandwidth-sensitive content sharing system further comprises:
a plurality of group profiles defining priority values for content sections pertinent to a subset of users,
a feedback handler configured to analyze the feedback data provided by the feedback handler to determine a need to change to at least one priority value of a group profile corresponding to the group identifier of the user of the mobile device, wherein the change reflects actual content section usage of the filtered content item, and
a content filter configured to determine priorities for the plurality of content sections that reflect a synthesis of the priority value assigned by the author and at least one of content priorities from the plurality of user data and the priority values defined in the group profile corresponding to the group association of the user of the mobile device and remove content sections having a determined priority value that is non-compliant with the bandwidth limitation from a copy of the content item being sent to the mobile device.

9. A computer program product comprising a non-transitory computer readable storage medium having computer usable program code embodied therewith, the computer usable program code comprising:
computer usable program code, stored in the non-transitory storage medium, configured to establish a content sharing session between at least two end-user devices, wherein at least one of the at least two end-user devices is a mobile device having at least one of a network constraint and a data usage constraint, and, wherein a user of one of the at least two end-user devices acts an originator of the content sharing session;
computer usable program code, stored in the non-transitory storage medium, configured to determine a bandwidth limitation for the mobile device from network connection data and user data, wherein said bandwidth limitation indicates a restriction to content sections of a content item the mobile device is to receive during the content sharing session, wherein a content section is an identifiable and discrete encapsulation of data within the content item; and
computer usable program code, stored in the non-transitory storage medium, configured to filter the content item shared with the mobile device based upon a priority value for each content section of the content item, wherein the filtered content item satisfies the bandwidth limitation of the mobile device, wherein
filtering the content item further comprises:
prioritizing the content sections according to priority values predefined by an author of the content item;
removing the content section having a lowest priority value from a copy of the content item being sent to the mobile device;
assessing the copy of the content item for compliance with the bandwidth limitation; and
when the copy of the content item is compliant with the bandwidth limitation, conveying the copy of the content item to the mobile device, and
prioritizing the content sections further comprises:
when the user data includes a group association for the user of the mobile device, obtaining a group profile corresponding to the group association, wherein the group profile expresses priority values for content sections defined for a subset of users;
when the user data includes user-defined content priorities, retrieving user-defined content priority values for the content sections comprising the content item;
comparing the priority values predefined by the author with the corresponding priority values of at least one of the group profile and the user-defined content priorities; and
when, for the content section, a discrepancy exists between a priority value predefined by the author and at least one corresponding priority value, resolving the discrepancy in accordance with a set of resolution rules, wherein either the priority value predefined by the author or one of the at least one corresponding priority values is given precedence for the content section.

10. The computer program product of claim 9, wherein determining the bandwidth limitation further comprises:
computer usable program code, stored in the non-transitory storage medium, configured to obtain the connection data for the mobile device and the user data for the user of the mobile device, wherein said connection data comprises at least network parameters for a network connection between the mobile device and the content sharing session and a data plan associated with the mobile device or the user of the mobile device, wherein the data plan defines at least a data usage limit and a current amount of data usage;
computer usable program code, stored in the non-transitory storage medium, configured to receive a user-defined bandwidth sensitivity value from a user interface of a bandwidth-sensitive content sharing system operating upon the mobile device, wherein a predefined default value is used when a user-entered bandwidth sensitivity value is unavailable; and
computer usable program code, stored in the non-transitory storage medium, configured to dynamically synthesize the bandwidth limitation from the connection data, user data, and the user-defined bandwidth sensitivity value using a predefined algorithm.

11. The computer program product of claim 9, further comprising:
computer usable program code, stored in the non-transitory storage medium, configured to, when the copy of the content item is non-compliant with the bandwidth limitation, repeat the removing of the content section having the lowest priority value and the assessing of the content item for compliance.

12. The computer program product of claim 9, further comprising:
- computer usable program code, stored in the non-transitory storage medium, configured to, upon termination of the content sharing session, request feedback data from the user of the mobile device, wherein said feedback data is focused upon at least a quality of the filtered content item and an applicability of the content sections of the filtered content item to the user's needs;
- computer usable program code, stored in the non-transitory storage medium, configured to analyze the feedback data to assess an accuracy of the filtering performed upon the content item; and
- computer usable program code, stored in the non-transitory storage medium, configured to, when necessary as a result of said analysis, adjust at least one parameter affecting the filtering of the content item.

\* \* \* \* \*